Patented Feb. 20, 1923.

1,445,888

UNITED STATES PATENT OFFICE.

BENJAMIN H. HUNT, OF WALLA WALLA, WASHINGTON.

FENDER BRACE.

Application filed March 19, 1921. Serial No. 453,763.

*To all whom it may concern:*

Be it known that I, BENJAMIN H. HUNT, a citizen of the United States, residing at Walla Walla, in the county of Walla Walla and State of Washington, have invented new and useful Improvements in Fender Braces, of which the following is a specification.

This invention relates to attachments for automobiles and has for its object the provision of a brace for holding the front fenders rigid and preventing vibration with the resultant disagreeable rattling and sqeaking.

An important object is the provision of a brace of this character which is secured to the frame, the fenders and the headlights whereby to hold not only the fenders but also the head lamps rigidly, the brace furthermore serving as suspension means for license plates.

An additional object is the provision of a device of this character which will be simple and inexpensive in manufacture, highly efficient in use, durable in service and a general improvement in the art.

With the above and other objects and advantages in view, the invention consists in the details of construction to be hereinafter more fully described and claimed, and illustrated in the accompanying drawings, in which:—

Referring more particularly to the drawings the letter A designates the radiator of an automobile, B designates the frame bars, C designates the front fenders, D designates the head lamps and E designates the standards which support the lamp.

Figure 1:
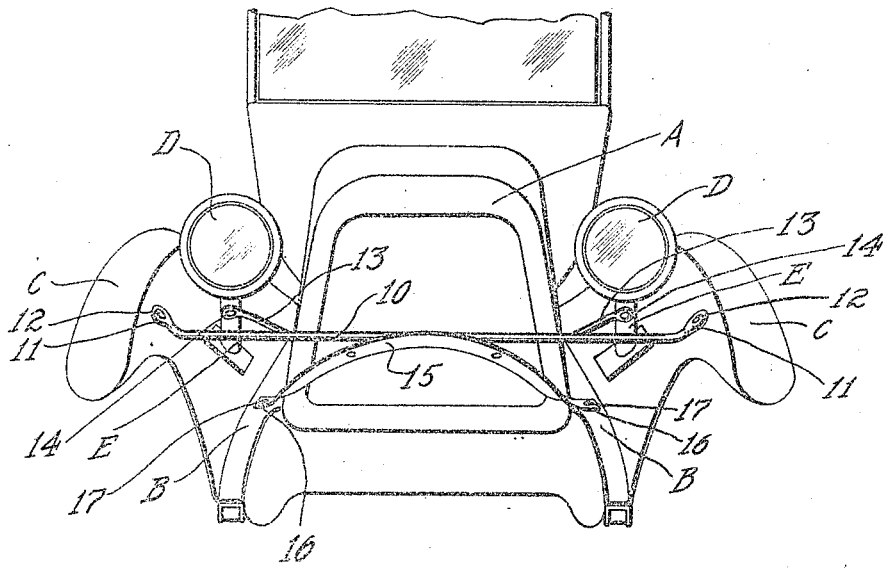
Figure 1 is a perspective view showing my device applied to the front portion of an automobile.
Figure 2:
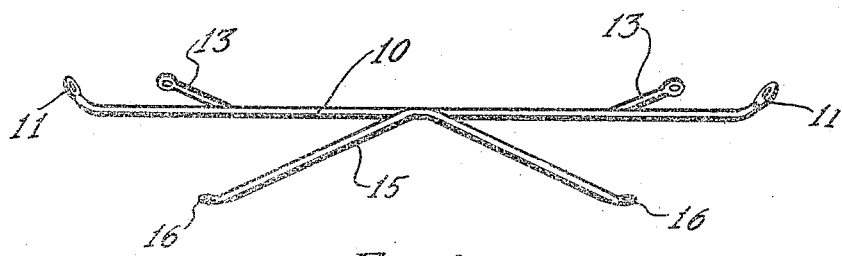
Figure 2 is a perspective view of a slightly modified form, detached.

In carrying out my invention I provide a brace which includes a horizontal brace rod 10 which is disposed across the front of the radiator and which has slightly upturned or angularly deflected ends 11 apertured for the passage of bolts 12 for securing these ends to the fenders C. Suitably secured, but preferably welded to the bar 10 at points spaced inwardly from the ends thereof are rearwardly extending angular arms 13 which are secured to the lamp standards E by means of bolts 14. Secured to the underside of the bar 10 at its center, as by means of riveting or welding, is a bar 15 which may be of arcuate shape as shown in Figure 1 or which may be angular as shown in Figure 2. The ends of the bar 15 are slightly bent so as to extend horizontally and are disposed upon the upper edges of the frame bars C. These ends 16 are apertured for the passage of securing bolts 17 which pass through the frame bars and through the flanges at the inner edges of the fenders.

When my device is in position it is readily apparent that the fenders will be braced with respect to each other as well as with respect to the frame bars and lamps and that the lamps will also be effectually braced with respect to the frame bars and the fenders. In this way it will be readily apparent that vibration and jarring with the resultant disagreeable rattling and squeaking will be entirely eliminated as the parts are held so rigidly that relative movement is impossible.

While I have shown and described the preferred embodiment of my invention it is of course to be understood that I reserve the right to make such changes in the form, construction and arrangement of parts as will not depart from the spirit of the invention or the scope of the subjoined claims.

Having thus described by invention, I claim:—

1. A bracing device for the fenders of an automobile comprising a horizontally disposed rod having apertured ends, said ends being disposed against the fenders with the rod extending across the front of the radiator securing bolts passing through said ends and through the fenders, a second rod secured centrally to said first named rod and having its end portions extending downwardly and engaging against the top of the frame bars, and securing bolts passing through the ends of said second named bar and through the frame bars.

2. Means for bracing the fenders and lamps of an automobile, comprising a rod extending horizontally across the front of the radiator and having angularly inclined ends flatly engaging against the fenders and secured thereto, rearwardly extending arms on said rods secured to the standards which support the headlamps, and a bar secured centrally to said rods and having its ends extending downwardly and bent to lie flat upon the tops of the frame bars, said last named ends being secured to the frame bars.

3. Means for bracing the fenders and lamps of an automobile comprising a horizontally disposed rod located in advance of the radiator and having its ends angularly offset and secured to the inclined portions of the fenders between the lamp standards and the adjacent beads of the fenders, a downwardly extending member carried by a rod at the center thereof and having angularly offset apertured ends bolted to the forward portions of the frame bars of the vehicle, and angular rearwardly inclined arms extending from the rod and having apertured ends bolted to the lamp standards.

4. A bracing device for the front fenders of automobiles, comprising an inverted substantially U-shaped yoke disposed in advance of the radiator and having the ends of its arms secured at the forward ends of the frame of the vehicle, and a substantially horizontal bar secured intermediate its ends on the upper portion of said yoke and having its ends secured upon the front fenders.

In testimony whereof I affix my signature.

BENJAMIN H. HUNT.